United States Patent
Minami et al.

(10) Patent No.: US 10,422,668 B2
(45) Date of Patent: Sep. 24, 2019

(54) METHOD AND PROGRAM FOR ANGLE CALIBRATION OF ROTARY SHAFT

(71) Applicant: Fanuc Corporation, Yamanashi (JP)

(72) Inventors: Hiroshi Minami, Yamanashi (JP); Toyoaki Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/980,388

(22) Filed: May 15, 2018

(65) Prior Publication Data
US 2018/0335327 A1 Nov. 22, 2018

(30) Foreign Application Priority Data
May 22, 2017 (JP) .................. 2017-100567

(51) Int. Cl.
*G01D 18/00* (2006.01)
*G01D 5/244* (2006.01)

(52) U.S. Cl.
CPC ....... *G01D 18/008* (2013.01); *G01D 5/24452* (2013.01)

(58) Field of Classification Search
CPC .... G01P 21/00; G01D 18/00; G01D 5/24452; G01D 18/008
See application file for complete search history.

(56) References Cited

U.S. PATENT DOCUMENTS

| | | | | |
|---|---|---|---|---|
| 5,969,817 A | * | 10/1999 | Ohsawa | G01B 11/26 356/510 |
| 6,320,344 B1 | * | 11/2001 | Sakamoto | G05B 19/19 318/567 |
| 6,655,187 B1 | * | 12/2003 | Lehner | G01B 7/30 73/1.75 |

(Continued)

FOREIGN PATENT DOCUMENTS

| | | |
|---|---|---|
| CN | 104698966 A | 6/2015 |
| CN | 105651324 A | 6/2016 |

(Continued)

OTHER PUBLICATIONS

Japan Patent Office, Decision to Grant a Patent dated Sep. 11, 2018 for Japan Patent Application No. 2017-100567.

(Continued)

*Primary Examiner* — Daniel S Larkin
*Assistant Examiner* — Anthony W Megna Fuentes
(74) *Attorney, Agent, or Firm* — Winstead PC

(57) ABSTRACT

Provided is a method for angle calibration of a rotary shaft, including: attaching a calibrating angular sensor to a first rotary shaft of an industrial machine including a plurality of rotary shafts and a control unit that controls the rotary shafts based on an angle detected by a controlling angular sensor provided for each rotary shaft, the calibrating angular sensor being more precise than the controlling angular sensor; connecting the calibrating angular sensor in place of the controlling angular sensor of a second rotary shaft; rotating (Continued)

the first rotary shaft; calculating a difference between a first angle of the first rotary shaft detected by the controlling angular sensor and a second angle of the first rotary shaft detected by the calibrating angular sensor; and storing the calculated difference as a calibration value for an angle of rotation of the first rotary shaft.

3 Claims, 3 Drawing Sheets

(56) References Cited

U.S. PATENT DOCUMENTS

| | | | | |
|---|---|---|---|---|
| 6,778,939 B2* | 8/2004 | Sanpei | ............. | B62D 15/02 |
| | | | | 180/422 |
| 2005/0028614 A1* | 2/2005 | Saito | ............. | G01D 3/0365 |
| | | | | 73/862.333 |
| 2006/0043964 A1* | 3/2006 | Watanabe | ......... | G01D 5/24452 |
| | | | | 324/200 |
| 2009/0292503 A1* | 11/2009 | Hon | ............. | B23Q 17/22 |
| | | | | 702/168 |
| 2011/0298411 A1* | 12/2011 | Yoshida | ............ | G01D 5/3473 |
| | | | | 318/640 |
| 2012/0222465 A1* | 9/2012 | Lippuner | ........... | G01D 5/24452 |
| | | | | 73/1.75 |
| 2012/0283978 A1* | 11/2012 | Watanabe | ......... | G01D 5/24452 |
| | | | | 702/94 |
| 2014/0236520 A1* | 8/2014 | Engel | ............. | G01D 5/24452 |
| | | | | 702/95 |
| 2015/0160049 A1* | 6/2015 | Oki | ............. | G01B 21/042 |
| | | | | 702/97 |
| 2015/0292918 A1* | 10/2015 | Yoshida | ............ | G01D 5/34707 |
| | | | | 318/640 |
| 2015/0323355 A1* | 11/2015 | Kramer | ............. | G01S 7/4817 |
| | | | | 250/231.14 |
| 2016/0164383 A1* | 6/2016 | Takada | ............. | H02K 11/22 |
| | | | | 250/231.13 |

FOREIGN PATENT DOCUMENTS

| | | |
|---|---|---|
| GB | 2316742 A | 3/1998 |
| JP | H05-318284 A | 12/1993 |
| JP | H10-118894 A | 5/1998 |
| JP | 2009-31120 A | 2/2009 |
| JP | 4532577 B2 | 8/2010 |
| JP | 2011-169815 A | 9/2011 |
| JP | 2012-091268 A | 5/2012 |
| JP | 2015-223683 A | 12/2015 |
| JP | 2016-109436 A | 6/2016 |
| JP | 2016-118491 A | 6/2016 |

OTHER PUBLICATIONS

State Intellectual Property Office of People's Republic of China, Office Action dated Jan. 22, 2019 for Application No. 201810475551.1.

* cited by examiner

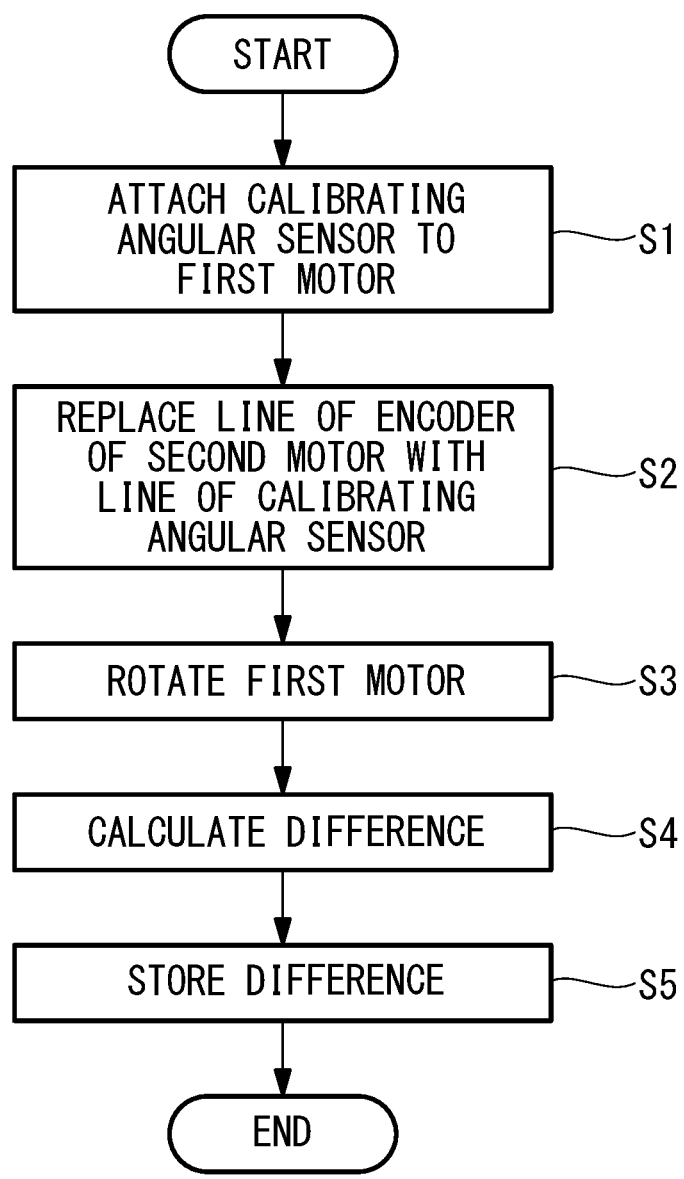

//(1)
METHOD AND PROGRAM FOR ANGLE CALIBRATION OF ROTARY SHAFT

CROSS-REFERENCE TO RELATED APPLICATIONS

This application is based on Japanese Patent Application No. 2017-100567, the contents of which are incorporated herein by reference.

TECHNICAL FIELD

The present invention relates to a method and program for angle calibration of a rotary shaft.

BACKGROUND ART

Conventionally, angle calibration of a rotary table of a machine tool is performed by: rotating the rotary table while a high-precision angle measuring system for calibration is attached to the rotary table; calculating, as a calibration value, the difference between a value of the angle of rotation detected by an angular sensor of the rotary table provided on the machine tool and a value measured by the high-precision angle measuring system; and inputting the calculated calibration value to a controller (for example, see PTL 1).

CITATION LIST

Patent Literature

{PTL 1}
Japanese Unexamined Patent Application, Publication No. Hei10-118894

SUMMARY OF INVENTION

The present invention provides the following solutions.
An aspect of the present invention provides a method for angle calibration of a rotary shaft. The method includes: attaching a calibrating angular sensor to a first rotary shaft of an industrial machine including a plurality of rotary shafts and a control unit that controls the rotary shafts based on an angle detected by a controlling angular sensor provided for each rotary shaft, the calibrating angular sensor being more precise than the controlling angular sensor and outputting the same type of data as the controlling angular sensor; connecting the calibrating angular sensor in place of the controlling angular sensor of a second rotary shaft that is different from the first rotary shaft; rotating the first rotary shaft; calculating, by the control unit, a difference between a first angle of the first rotary shaft detected by the controlling angular sensor and a second angle of the first rotary shaft detected by the calibrating angular sensor; and storing the calculated difference as a calibration value for an angle of rotation of the first rotary shaft.

Another aspect of the present invention provides a program for angle calibration. When a calibrating angular sensor is attached to a first rotary shaft of an industrial machine including a plurality of rotary shafts and a control unit that controls the rotary shafts based on an angle detected by a controlling angular sensor provided for each rotary shaft, the calibrating angular sensor being more precise than the controlling angular sensor and outputting the same type of data as the controlling angular sensor, the calibrating angular sensor is connected in place of the controlling angular sensor of a second rotary shaft that is different from the first rotary shaft, and the first rotary shaft is rotated, the program causes a computer to perform: a difference calculation step of calculating a difference between a first angle of the first rotary shaft detected by the controlling angular sensor and a second angle of the first rotary shaft detected by the calibrating angular sensor; and a storage step of storing the difference calculated in the difference calculation step as a calibration value for an angle of rotation of the first rotary shaft.

ADVANTAGEOUS EFFECTS OF INVENTION

FIG. 3 is a flowchart illustrating the method for angle calibration according to an embodiment of the present invention.

DESCRIPTION OF EMBODIMENTS

A method for angle calibration of a rotary shaft according to an embodiment of the present invention will be described below with reference to the drawings.

Figure 1:
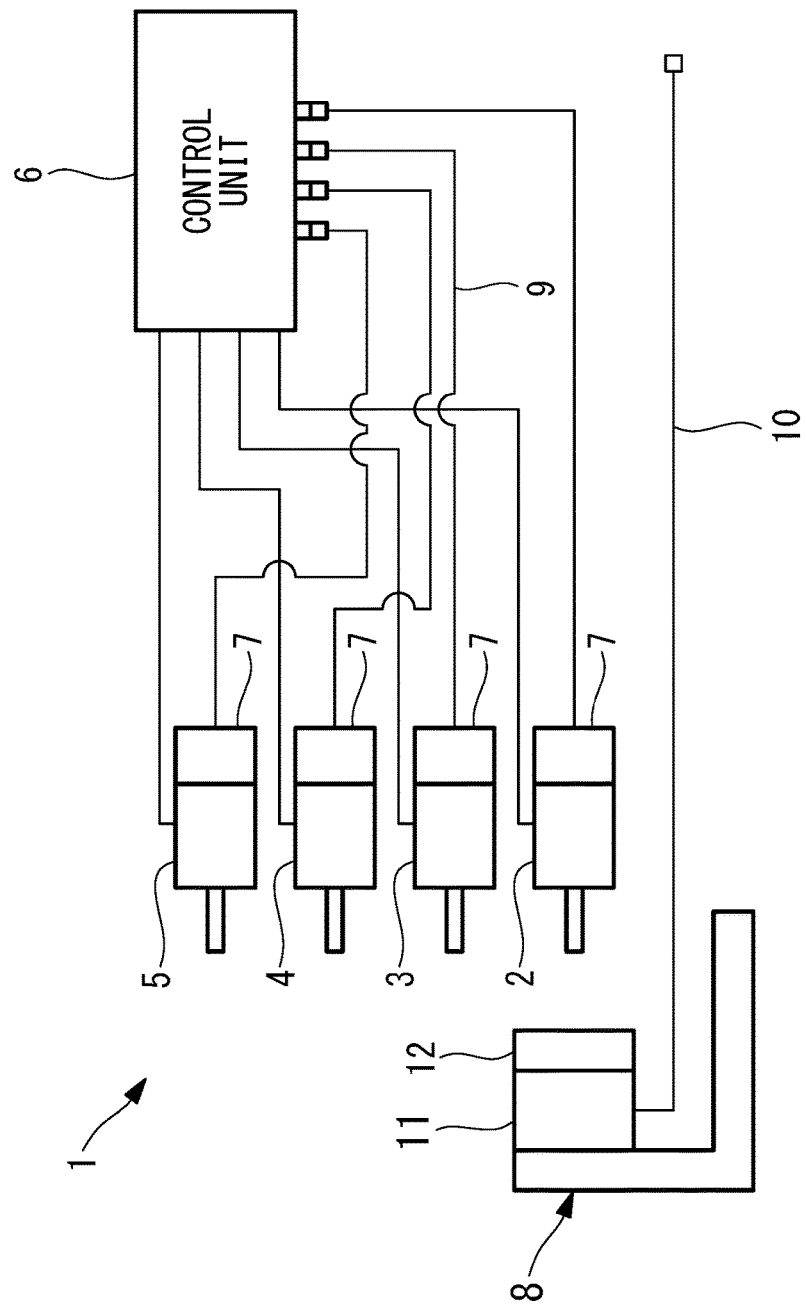
FIG. 1 illustrates an example of a machine tool and a calibrating angular sensor to which a method for angle calibration of a rotary shaft according to an embodiment of the present invention is applied.

An industrial machine to which the method for angle calibration according to this embodiment is applied may be a machine tool 1. As shown in FIG. 1, the machine tool 1 includes: two motors (a first and second rotary shafts, or rotary shafts) 2 and 3 that respectively rotate two rotary tables (not shown); other motors (rotary shafts) 4 and 5; and a control unit 6 that controls these motors 2, 3, 4, and 5.

Each of the motors 2, 3, 4, and 5 is provided with an encoder (a controlling angular sensor) 7 that detects the angle of rotation. The control unit 6 is a computer, which includes a processor (not shown) that perform computation, and memory (not shown) that stores data. The control unit 6 controls the motors 2, 3, 4, and 5 based on the angles of rotation detected by the encoders 7 to rotate the rotary tables at a predetermined rotation speed and angular position.

Figure 2:
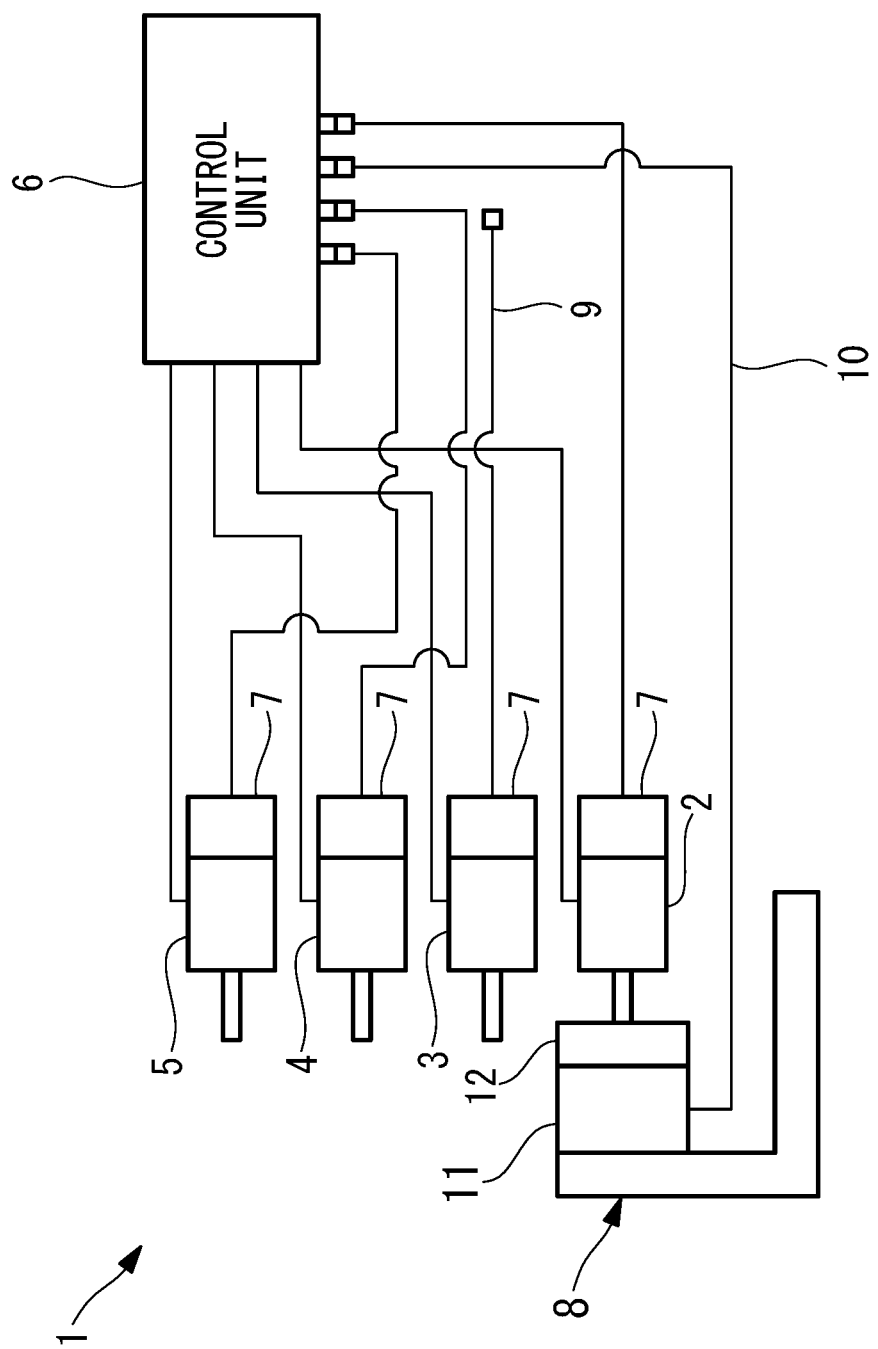
FIG. 2 is a diagram illustrating the machine tool of FIG. 1 having the calibrating angular sensor mounted thereon according to the method for angle calibration of FIG. 1.

As shown in FIGS. 1 to 3, the method for angle calibration according to this embodiment includes step S1 of attaching a calibrating angular sensor 8 to the motor (hereinafter referred to as a first motor) 2 of a first rotary table having the encoder 7 to be calibrated attached thereto, where the calibrating angular sensor 8 can detect the angle of rotation more precisely than the encoders 7 provided for the motors 2, 3, 4, and 5. The method further includes step S2 of detaching a line 9 connecting between the encoder 7 provided for the motor (hereinafter referred to as a second motor) 3 rotating a second rotary table and the control unit 6, and, instead, connecting an output line 10 of the calibrating angular sensor 8 to the control unit 6.

The calibrating angular sensor 8 includes: a reading unit 11 fixed to a fixture disposed external to the two rotary tables; and a scale unit 12 supported rotationally about a predetermined axis with respect to the reading unit 11. Step S1 of attaching the calibrating angular sensor 8 to the first motor 2 involves fixing the scale unit 12 of the calibrating angular sensor 8 to the first motor 2 with the axis of the scale unit 12 aligned with the axis of the first motor 2.

Accordingly, the calibrating angular sensor 8 is mounted on the machine tool 1 as shown in FIG. 2. As a result of step S2 of replacing the line 9 with the output line 10, the control unit 6 of the machine tool 1 recognizes a value detected by the calibrating angular sensor 8 as a value detected by the encoder 7 provided for the second motor 3.

As shown in FIG. 3, the method for angle calibration according to this embodiment then causes the control unit 6 to execute a program for angle calibration. The program for angle calibration causes the processor to perform: rotation step S3 of rotating the first motor 2; difference calculation step S4 of calculating the difference between a first angle detected by the encoder 7 provided for the first motor 2 and a second angle detected by the calibrating angular sensor 8; and storage step S5 of storing, in the memory, the calculated difference as a calibration value for the angle of rotation of the first rotary table.

While the control unit 6 executes the program for angle calibration, the first motor 2 of the first rotary table is rotated to cause rotation of the first rotary table. Thus, the first angle is detected by the encoder 7 provided for the first motor 2, whereas the second angle is detected by the calibrating angular sensor 8 as the scale unit 12 of the calibrating angular sensor 8 fixed coaxially to the first rotary table is rotated with respect to the reading unit 11.

That is, the angle of rotation of the same first rotary table is detected by both the encoder 7 and the calibrating angular sensor 8. The control unit 6 calculates the difference between the detected first and second angles and stores the calculated difference in the memory.

Since the calibrating angular sensor 8 can detect the angle of rotation more precisely than the encoder 7, a small difference indicates precise detection of the angle of rotation by the encoder 7, and a large difference indicates deviation of the angle of rotation detected by the encoder 7.

The difference between the first angle detected by the encoder 7 and the second angle detected by the calibrating angular sensor 8 is stored in the memory. In actual control of the first rotary table, the stored difference can be used to correct the angle of rotation detected by the encoder 7 and precisely control the two rotary tables.

Thus, with the method for angle calibration according to this embodiment, the calibrating angular sensor 8 that is more precise than the encoder 7 provided for the first motor 2 of the first rotary table and that outputs the same type of data as the encoder 7 is connected to the control unit 6 in place of the encoder 7 of the second rotary table. This allows the control unit 6 to recognize the angle of rotation detected by the calibrating angular sensor 8 without a dedicated angle reader.

Since the control unit 6 itself can compute the difference using the simple program for angle calibration executable by the control unit 6, no dedicated computer for computing the difference is required. That is, the method for angle calibration according to this embodiment advantageously enables precise calibration of the encoders 7 of the rotary shafts 2, 3, 4, and 5 without a dedicated angle reader or computer.

After the calibration value for the encoder 7 of the first rotary table is stored in the memory with the method for angle calibration according to this embodiment, the first and second rotary tables can be exchanged to perform the same steps. As a result, a calibration value for the encoder 7 of the second rotary table can also be stored in the memory.

Further, after the calibration is finished, the detached encoder 7 can be reconnected to the control unit 6 in place of the calibrating angular sensor 8 to operate the machine tool 1 that is now precisely calibrated.

While this embodiment illustrates the case where the method for angle calibration is applied to the machine tool 1 having two rotary tables, the method may be applied to any other industrial machines.

Also, if the encoders 7 of the rotary shafts that respectively rotate two rotary tables 2 and 3 and other rotary shafts 4 and 5 employ a common data type, the method may be applied to calibration of the encoders 7 of the rotary shafts 2, 3, 4, and 5.

Also, while this embodiment illustrates the case where two rotary tables are used as the rotary tables on which a workpiece is placed, any number of rotary tables may be used.

This embodiment illustrates the case where the line 9 connecting between the encoder 7 and the control unit 6 is detached and the output line 10 of the calibrating angular sensor 8 is connected to the control unit 6. Alternatively, the line 9 may have a switch to which the output line 10 is connected.

In this case, the switch switches between the value of the second motor 3 detected by the encoder 7 and the value of the first motor 2 detected by the calibrating angular sensor 8. Thus, the first and second angles of the first motor 2 can be detected without detaching the line 9 from and attaching the output line 10 to the control unit 6. The switch may be manually operated or may be automatically operated by the control unit 6.

From the above-described embodiments and modifications thereof, the following aspects of the invention are derived. An aspect of the present invention provides a method for angle calibration of a rotary shaft. The method includes: attaching a calibrating angular sensor to a first rotary shaft of an industrial machine including a plurality of rotary shafts and a control unit that controls the rotary shafts based on an angle detected by a controlling angular sensor provided for each rotary shaft, the calibrating angular sensor being more precise than the controlling angular sensor and outputting the same type of data as the controlling angular sensor; connecting the calibrating angular sensor in place of the controlling angular sensor of a second rotary shaft that is different from the first rotary shaft; rotating the first rotary shaft; calculating, by the control unit, a difference between a first angle of the first rotary shaft detected by the controlling angular sensor and a second angle of the first rotary shaft detected by the calibrating angular sensor; and storing the calculated difference as a calibration value for an angle of rotation of the first rotary shaft.

According to this aspect, to calibrate the angle of rotation of any rotary shaft (the first rotary shaft) of the industrial machine having multiple rotary shafts, the calibrating angular sensor that is more precise than the controlling angular sensor provided for the first rotary shaft is attached to the first rotary shaft. The attached calibrating angular sensor is then connected in place of the controlling angular sensor of the second rotary shaft that is different from the first rotary shaft, and the first rotary shaft is rotated.

Accordingly, the angle of rotation of the first rotary shaft is detected by the controlling angular sensor of the first rotary shaft and by the calibrating angular sensor. That is, the value detected by the high-precision calibrating angular sensor is detected as the angle of rotation of the second rotary shaft. Therefore, in calibrating the controlling angular sensor of the first rotary shaft, the control unit can readily obtain a calibration value for the controlling angular sensor of the first rotary shaft by calculating the difference between the angle of rotation of the first rotary shaft and the angle of rotation of the second rotary shaft.

The calculated calibration value is then stored. Thus, the controlling angular sensor of the first rotary shaft can be precisely calibrated without a dedicated angle reader or computer.

In the above aspect, the industrial machine may be a machine tool for processing a workpiece, and the first and second rotary shafts may be rotary tables on which the workpiece is placed.

In this manner, the controlling angular sensor of one of the first and second rotary shafts can be precisely calibrated based on the angle of rotation of the other rotary shaft detected by the calibrating angular sensor. Mutual calibration can be performed between rotary tables for which the same type of controlling angular sensor is used.

Another aspect of the present invention provides a program for angle calibration. When a calibrating angular sensor is attached to a first rotary shaft of an industrial machine including a plurality of rotary shafts and a control unit that controls the rotary shafts based on an angle detected by a controlling angular sensor provided for each rotary shaft, the calibrating angular sensor being more precise than the controlling angular sensor and outputting the same type of data as the controlling angular sensor, the calibrating angular sensor is connected in place of the controlling angular sensor of a second rotary shaft that is different from the first rotary shaft, and the first rotary shaft is rotated, the program causes a computer to perform: a difference calculation step of calculating a difference between a first angle of the first rotary shaft detected by the controlling angular sensor and a second angle of the first rotary shaft detected by the calibrating angular sensor; and a storage step of storing the difference calculated in the difference calculation step as a calibration value for an angle of rotation of the first rotary shaft.

Advantageous Effects of Invention

The present invention has advantageous effects of enabling precise calibration of an angular sensor of a rotary shaft without a dedicated angle reader or computer.

REFERENCE SIGNS LIST 1 machine tool (industrial machine)
2 first motor (first rotary shaft, rotary shaft)
3 second motor (second rotary shaft, rotary shaft)
4, 5 motor (rotary shaft)
6 control unit
7 encoder (controlling angular sensor)
8 calibrating angular sensor
S4 difference calculation step
S5 storage step

The invention claimed is:

1. A method for angle calibration of a rotary shaft, the method comprising:
   attaching a calibrating angular sensor to a first rotary shaft of an industrial machine including a plurality of rotary shafts and a control unit configured to control the rotary shafts based on an angle detected by a controlling angular sensor provided for each rotary shaft, wherein each controlling angular sensor is connected to the control unit, the calibrating angular sensor being more precise than the controlling angular sensor and outputting the same type of data as the controlling angular sensor;
   connecting the calibrating angular sensor to the control unit in place of the controlling angular sensor of a second rotary shaft that is different from the first rotary shaft;
   rotating the first rotary shaft;
   calculating, by the control unit, a difference between a first angle of the first rotary shaft detected by the controlling angular sensor and a second angle of the first rotary shaft detected by the calibrating angular sensor; and
   storing the calculated difference as a calibration value for an angle of rotation of the first rotary shaft.

2. The method for angle calibration of a rotary shaft according to claim 1, wherein:
   the industrial machine is a machine tool for processing a workpiece; and
   the first rotary shaft and the second rotary shaft are rotary tables on which the workpiece is placed.

3. A program for angle calibration, wherein, when a calibrating angular sensor is attached to a first rotary shaft of an industrial machine including a plurality of rotary shafts and a control unit configured to the rotary shafts based on an angle detected by a controlling angular sensor provided for each rotary shaft, wherein each controlling angular sensor is connected to the control unit, the calibrating angular sensor being more precise than the controlling angular sensor and outputting the same type of data as the controlling angular sensor, the calibrating angular sensor is connected to the control unit in place of the controlling angular sensor of a second rotary shaft that is different from the first rotary shaft, and the first rotary shaft is rotated, the program causes a computer to perform:
   a difference calculation step of calculating a difference between a first angle of the first rotary shaft detected by the controlling angular sensor and a second angle of the first rotary shaft detected by the calibrating angular sensor; and
   a storage step of storing the difference calculated in the difference calculation step as a calibration value for an angle of rotation of the first rotary shaft.

* * * * *